(12) United States Patent
Wen et al.

(10) Patent No.: US 8,910,696 B2
(45) Date of Patent: Dec. 16, 2014

(54) SLAT CONTROLLER OF WINDOW BLIND

(75) Inventors: Yu-Che Wen, Taoyuan County (TW); Chih-Yao Chang, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 321 days.

(21) Appl. No.: 13/403,290

(22) Filed: Feb. 23, 2012

(65) Prior Publication Data

US 2013/0220044 A1    Aug. 29, 2013

(30) Foreign Application Priority Data

Nov. 25, 2011    (CN) ...................... 2011 2 0489766 U

(51) Int. Cl.
*E06B 9/307* (2006.01)

(52) U.S. Cl.
USPC ...................................................... 160/177 R

(58) Field of Classification Search
USPC ........... 74/411; 160/168.1 R, 176.1 R, 176.1, 160/176.1 V, 178.1, 177, 173 R, 172 R
See application file for complete search history.

(56) References Cited

U.S. PATENT DOCUMENTS

| | | | |
|---|---|---|---|
| 2,809,531 A | 10/1957 | Moyer | |
| 4,875,516 A | 10/1989 | Marocco | |
| 4,955,248 A * | 9/1990 | Lindstrom | 74/424.5 |
| 5,293,921 A * | 3/1994 | Marocco | 160/176.1 R |
| 5,297,608 A * | 3/1994 | Rap et al. | 160/177 R |
| 6,308,764 B1 * | 10/2001 | Lin | 160/177 R |
| 6,325,133 B1 * | 12/2001 | Lin | 160/177 R |
| 6,786,270 B2 * | 9/2004 | Wen et al. | 160/170 |
| 6,805,186 B1 * | 10/2004 | Nien | 160/177 R |
| 7,562,600 B2 * | 7/2009 | Liu | 74/425 |
| D660,067 S * | 5/2012 | Di Stefano | D6/580 |

FOREIGN PATENT DOCUMENTS

| | | |
|---|---|---|
| CH | 661560 A5 | 7/1987 |
| CH | 661560 AS | 7/1987 |
| EP | 2085564 A2 * | 8/2009 |
| FR | 2800121 A1 | 4/2001 |

* cited by examiner

*Primary Examiner* — Troy Chambers
*Assistant Examiner* — Jude Agendia
(74) *Attorney, Agent, or Firm* — Tracy M. Heims; Apex Juris, PLLC

(57) ABSTRACT

A slat controller for a window blind has a gear, a worm member, and a connector. The gear connects to slats through cords, and the worm member having spiral teeth meshed with the gear. The connector has flexible arms, and the flexible arms have teeth. The worm member has teeth normally engaging the teeth of the connector, and the teeth of the worm member disengage the teeth of the connector to protect the meshed gear and the worm member when the user keeps turning the tilting rod beyond the allowable turning range.

12 Claims, 6 Drawing Sheets

SLAT CONTROLLER OF WINDOW BLIND

BACKGROUND OF THE INVENTION

1. Field of the Invention

The present invention relates generally to a window covering, and more particularly to a slat controller of a window blind, which may be self-protected when the controller is over-turned.

2. Description of the Related Art

FIG. 1 shows a window blind, including a top rail 52, a bottom rail 54, and a plurality of slats 56 between the top rail 52 and a bottom rail 54. The window blind is provided with a slat controller (not shown) in the top rail 52 to be operated to adjust the slats 56. The slat controller is connected to a rod 58 that user may turn the rod 58 to change angles of the slats 58 through pulling or releasing cords 60 coupled to the slats 56.

The conventional slat controller includes a worm and a gear meshed with the worm, in which the rod 58 is connected to the worm and the cords 60 are fastened to the gear that the cords 60 will be pulled or released when one turns the rod 58.

The rod 58 is unable to be turned when the slats 56 touch the neighboring slats 56. However, some users may still keep turning the rod 58, and it may break the worm and/or the gear to make the controller cannot operate normally.

SUMMARY OF THE INVENTION

The primary objective of the present invention is to provide a slat controller for a window blind, which may protect worm and the gear of the controller when one keep turning the rod beyond the allowable turning range.

According to the objective of the present invention, a slat controller for a window blind of the present invention includes a gear, a worm member, and a connector. The gear connects to slats through cords, and the worm member having a spiral tooth meshed with the gear. The worm member and the connector respectively have teeth. The teeth of the worm member normally engage the teeth of the connector, and the teeth of the worm member disengage the teeth of the connector when the gear and the worm member are unable to turn and the connector is turned.

In an embodiment, the connector is provided with flexible arms, on which the teeth are provided, and the flexible arms are moved away from teeth of the worm member to disengage the teeth.

In an embodiment, the worm member is provided with flexible arms, on which the teeth are provided, and the flexible arms are moved away from teeth of the connector to disengage the teeth.

In an embodiment, the present invention further includes two cases having cavities to receive the gear, the worm member, and the connector for free rotation.

In an embodiment, the teeth are semi-round for easily engaging and disengaging.

The present invention provides the connector between the worm member and the rod to protect the worm member and the gear when one keeps turning the rod beyond the allowable turning range.

DETAILED DESCRIPTION OF THE INVENTION

Figure 1:
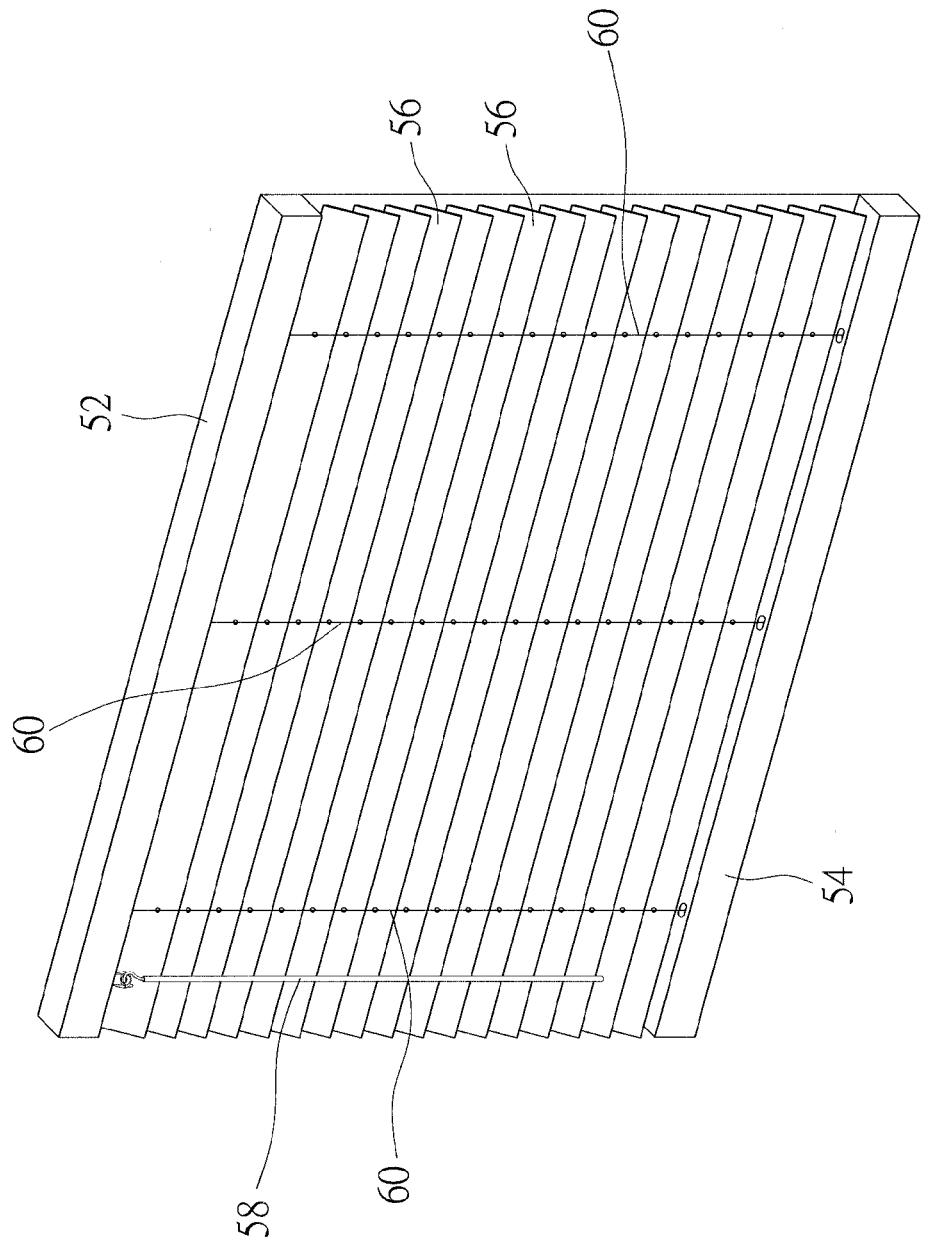
FIG. 1 is a perspective view of the window blind.
Figure 2:
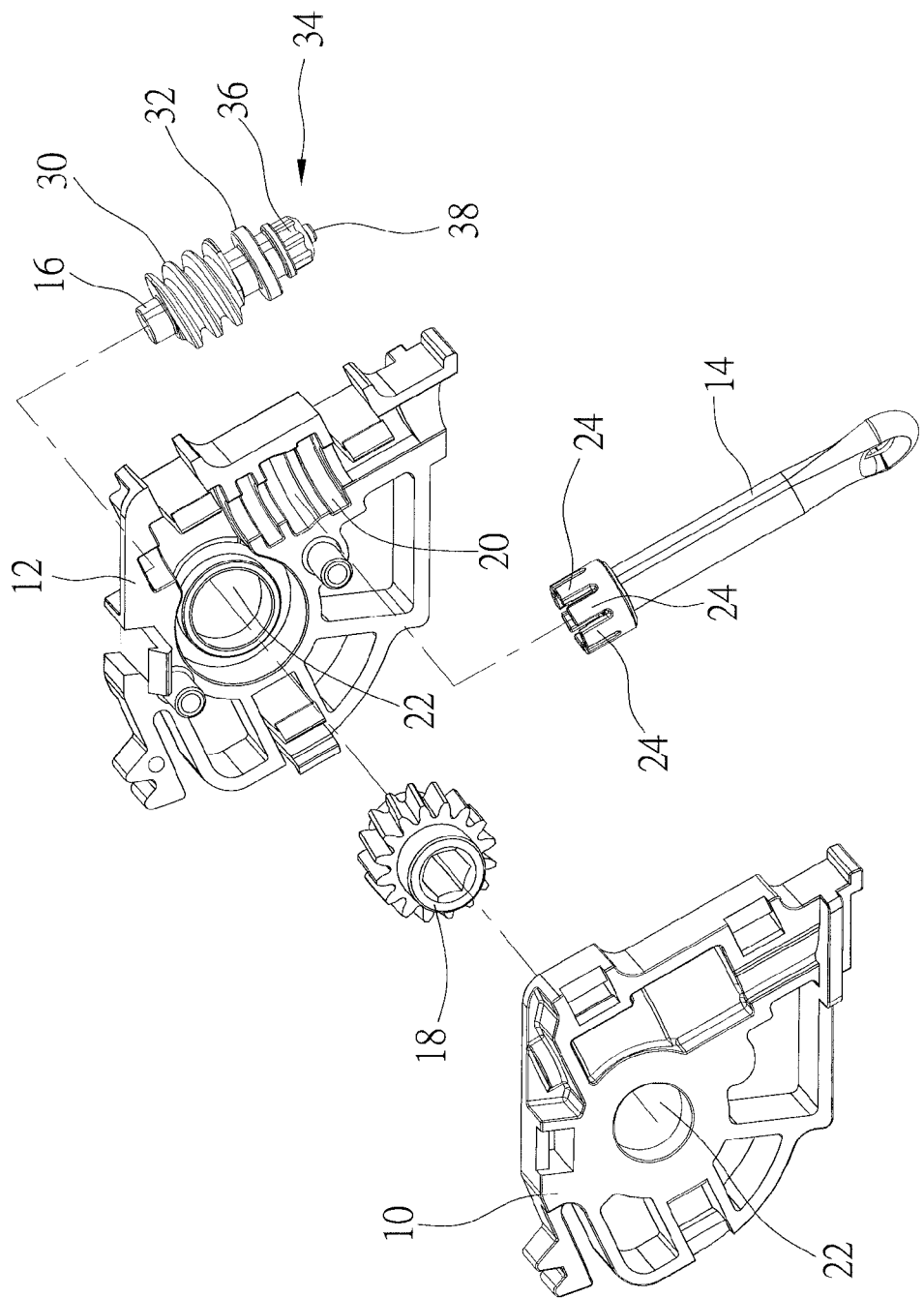
FIG. 2 is an exploded view of a first preferred embodiment of the present invention.
Figure 3:
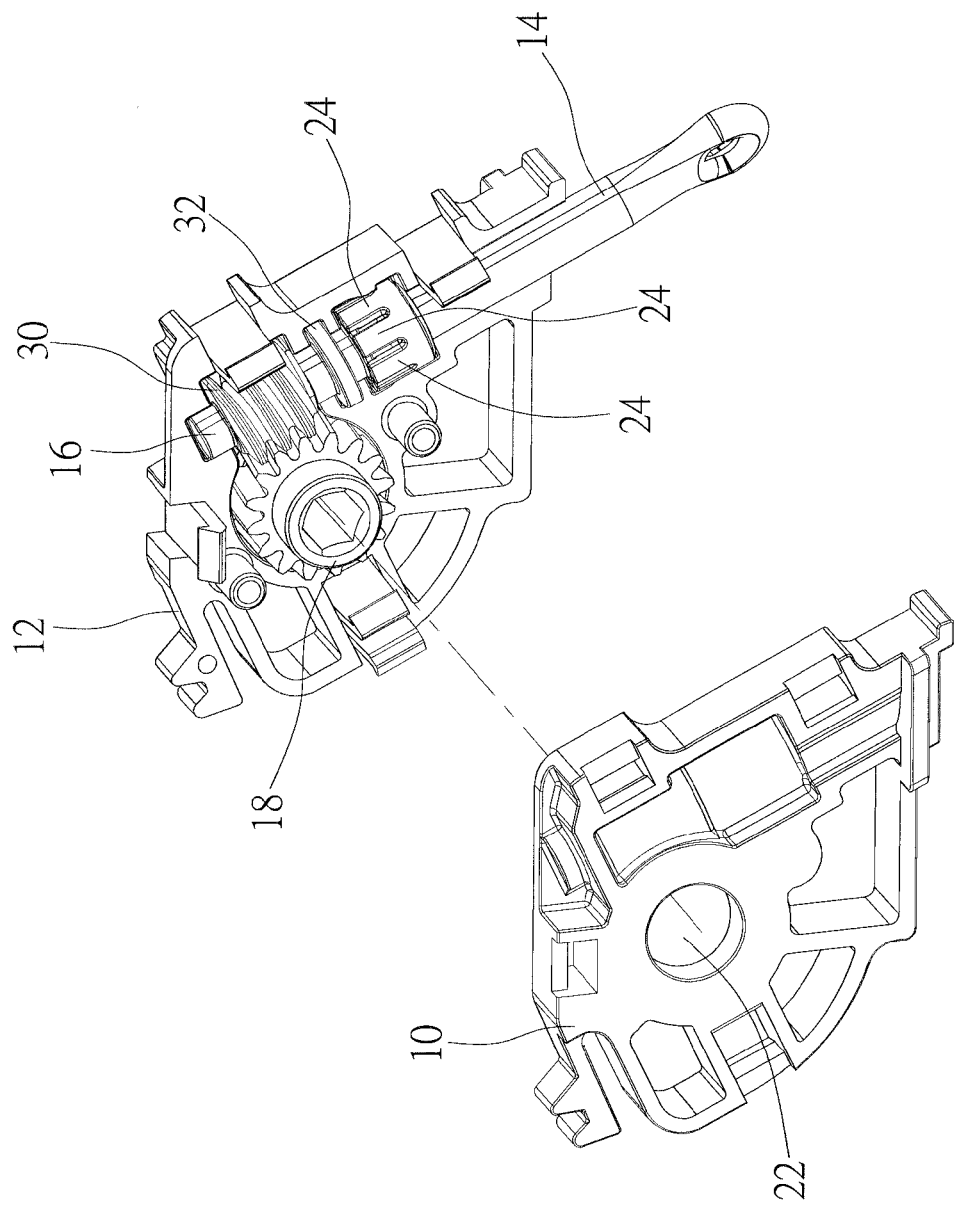
FIG. 3 is a perspective view of the first preferred embodiment of the present invention.
Figure 4:
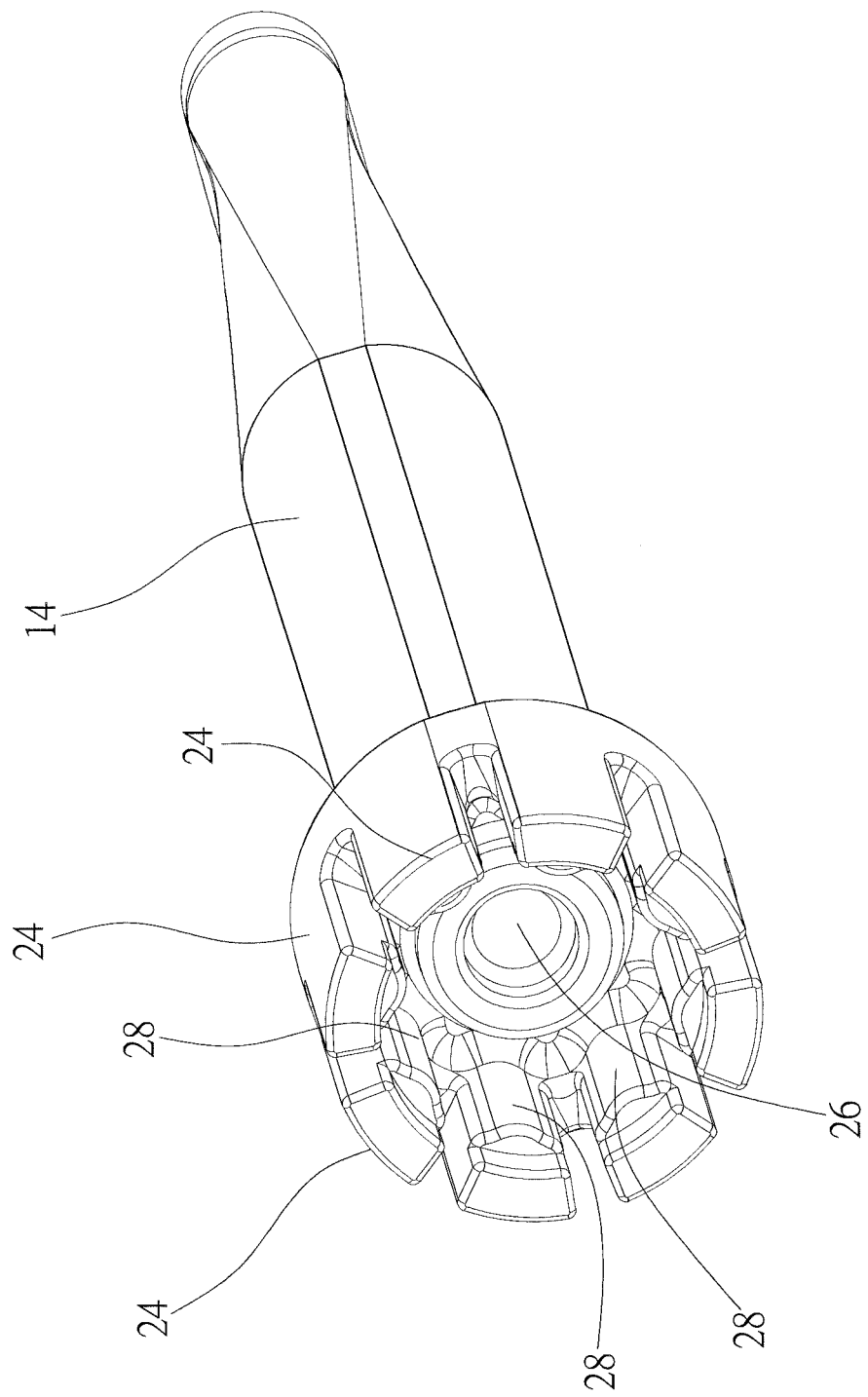
FIG. 4 is a perspective view of the connector of the first preferred embodiment of the present invention.

As shown in FIGS. 2 to 4, a slat controller of the first preferred embodiment of the present invention is mounted in a top rail (not shown) of a window blind to adjust angles of slats (not shown). The slat controller includes two cases 10 and 12, a connector 14, a worm member 16, and a gear 18.

The cases 10, 12 have specified cavities 20 to receive the connector 14, the worm member 16, and the gear 18 for free rotation. The cases 10, 12 have openings 22 associated with the gear 18 that an axle (not shown) is inserted into the cases 10, 12 via the openings 22 to be fixed to the gear 18. Cords (not shown), which connect to the slats, are fastened to the axle. A distal end of the connector 14 is left out of the cases 10, 12 to connect to a rod (not shown).

As shown in FIG. 4, the connector 14 is provided with flexible arms 24 at an inner end thereof. The flexible arms 24 are arranged in a circle to form a room. The connector 14 has a recess 26 at a bottom of the room, and each flexible arm 24 has a tooth 28 at an inner side thereof (facing the room).

The worm member 16 has a spiral tooth 30 meshed with the gear 18 and a flange 32 behind the spiral tooth 30. The worm member 16 further has a connecting portion 34 at an end thereof. The connecting portion 34 has teeth 36 on a circumference and a post 38 at a distal end thereof.

The connecting portion 34 of the worm member 16 is inserted into the room of the connector 14 that the post 38 is inserted into the recess 26 and the teeth 36 of the connecting portion 34 engage the teeth 28 on the flexible arms 24. Both the teeth 28, 36 on the flexible arms 24 and the connecting portion 34 are semi-round.

Figure 5:
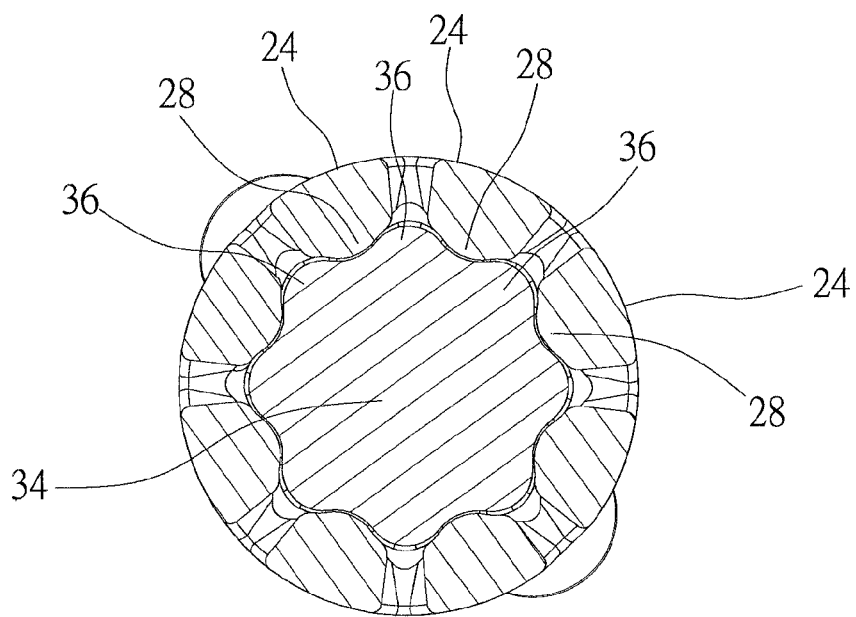
FIG. 5 is a sectional view of the first preferred embodiment of the present invention, showing the worm member engaging the connector engaged in normal condition.

As shown in FIG. 5, the teeth 36 of the connecting portion 34 normally engage the teeth 28 on the flexible arms 24 that the gear 18 will be turned through the connector 14 and the worm member 16 when user turns the rod. The turning gear 18 may pull or release the cords to adjust the angles of the slats.

Figure 6:
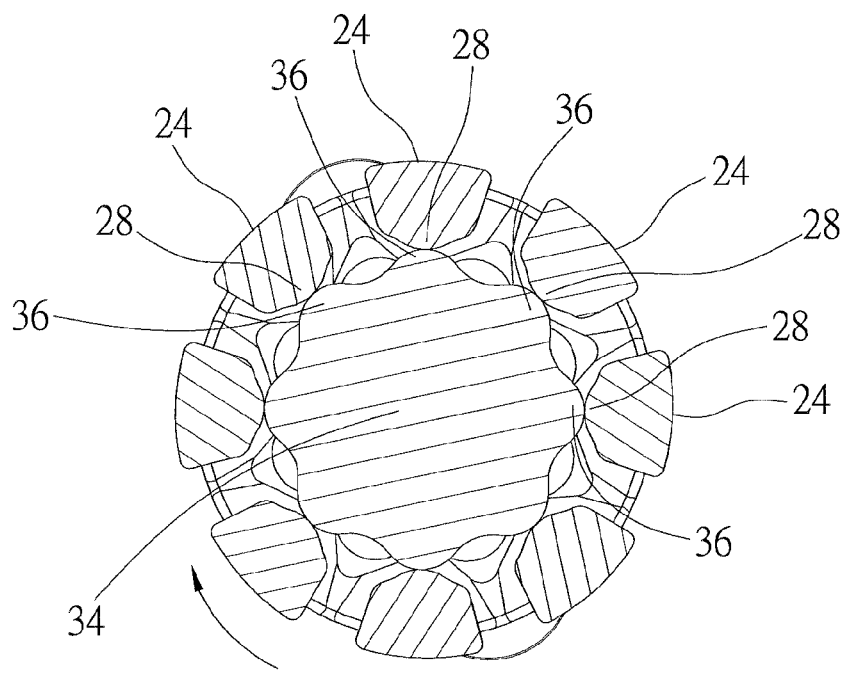
FIG. 6 is a sectional view of the first preferred embodiment of the present invention, showing the worm member disengaging the connector.

When the rod is turned for a predetermined angle, the slats will touch the neighboring slats, it will stop the gear 18, the worm member 16, and the connector 14, which means the rod should not be turned. If the user still tries to turn the rod anyway, as shown in FIG. 6, the gear 18 and the worm member 16 are kept still, and only the connector 14 is turned along with the rod. At this time, the flexible arms 26 of the connector 14 will be moved outwards, and the teeth 28 on the flexible arms 24 will cross the teeth 36 of the worm member 16 to the other sides and the flexible arms 24 will spring back to engage the teeth 28, 36 again. The teeth 28, 36 will repeatedly engage and disengage while the user keeps turning the rod. When the flexible arms 24 are moved outwards, it will provide the user, who turns the rod, a resistance, and the resistance will be gone when the flexible arms 24 spring back. It means that the user will get an intermittence resistance when he/she turns the rod beyond the allowable turning range. Furthermore, the flexible arms 24 will provide "click" sound when they are springing back. In conclusion, the present invention will provide user an intermittence resistance and sound feedback when he/she turns the rod beyond the allowable turning range to tell him/her that you should stop. It is obvious that the gear 18 and the worm member 16 are kept still at this moment, so that there is no risk of breaking the meshed teeth of the gear 18 and the worm member 16.

Figure 7:
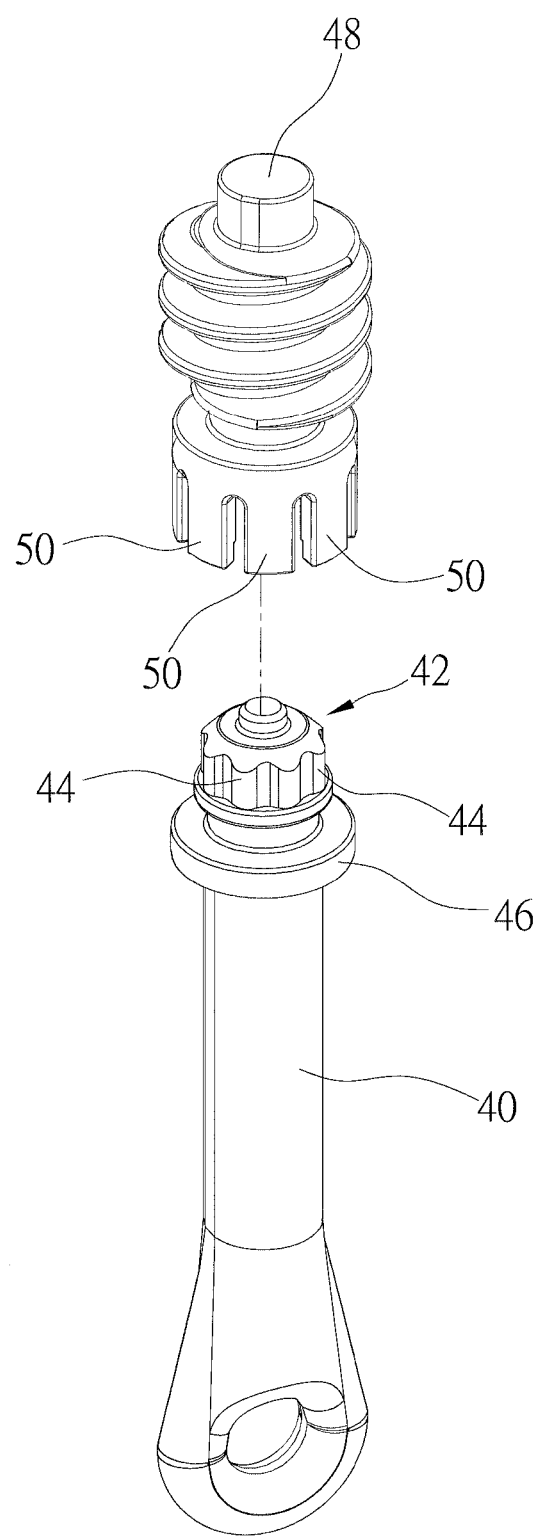
FIG. 7 is a perspective view of the connector and the worm member of a second preferred embodiment of the present invention.

FIG. 7 shows a slat controller of the second preferred embodiment of the present invention, which substantially is the same as the first preferred embodiment, except that the connecting portion 42 is on the connector 40, and the flexible arm 50 are on the worm member 48. The connecting portion 42 still has teeth 44 on a circumference thereof and a flange 46 behind the connecting portion 42. The flexible arms 50 are arranged in a circle, each of which has a tooth (not shown) on an inner side thereof to engage the teeth 44 on the connecting portion 42. The operation and function of the second preferred embodiment are the same as the first preferred embodiment, so we do not describe the detail again.

The present invention provides the connector between the worm member and the rod to protect the worm member and the gear when one keeps turning the rod beyond the allowable turning range. The present invention further may provide the user a resistance and sound feedback to tell him/her to stop.

The description above is a few preferred embodiments of the present invention and the equivalence of the present invention is still in the scope of claim construction of the present invention.

What is claimed is:

1. A slat controller for a window blind, comprising:
   a gear connecting to slats through cords;
   a worm member having a spiral tooth meshed with the gear, wherein the worm member further has teeth; and
   a connector having teeth;
   wherein the teeth of the worm member normally engage the teeth of the connector, and the teeth of the worm member disengage the teeth of the connector when the gear and the worm member are unable to turn and the connector is turned;
   wherein the connector is provided with flexible arms, on which the teeth are provided, and the flexible arms have ends connected to the connector and are separately arranged in a circle to form a room; the worm member has a connecting portion received in the room, and the connecting portion has the teeth; the flexible arms are moved away from the teeth of the worm member when the connector is disengaged with the worm member.

2. The slat controller as defined in claim 1, wherein the worm member has a flange between the spiral tooth and the connecting portion.

3. The slat controller as defined in claim 1, wherein the connector is provided with a recess on a bottom of the room, and the worm member has a post inserted into the recess.

4. The slat controller as defined in claim 1, further comprising two cases having cavities to receive the gear, the worm member, and the connector for free rotation.

5. The slat controller as defined in claim 1, wherein the teeth of the connector are semi-round.

6. The slat controller as defined in claim 1, wherein the teeth of the worm member are semi-round.

7. A slat controller for a window blind, comprising:
   a gear connecting to slats through cords;
   a worm member having a spiral tooth meshed with the gear, wherein the worm member further has teeth; and
   a connector having teeth;
   wherein the teeth of the worm member normally engage the teeth of the connector, and the teeth of the worm member disengage the teeth of the connector when the gear and the worm member are unable to turn and the connector is turned;
   wherein the worm member is provided with flexible arms, on which the teeth are provided, and the flexible arms have ends connected to the connector and are separately arranged in a circle to form a room; the connector worm member has a connecting portion received in the room, and the worm has the teeth; the flexible arms are moved away from the teeth of the connector when the connector is disengaged with the worm member;
   wherein the flexible arms are moved independently, and the room has openings between the flexible arms.

8. The slat controller as defined in claim 7, wherein the connector has a flange behind the connecting portion.

9. The slat controller as defined in claim 7, wherein the worm member is provided with a recess on a bottom of the room, and the connector has a post inserted into the recess.

10. The slat controller as defined in claim 7, further comprising two cases having cavities to receive the gear, the worm member, and the connector for free rotation.

11. The slat controller as defined in claim 7, wherein the teeth of the connector are semi-round.

12. The slat controller as defined in claim 7, wherein the teeth of the worm member are semi-round.

* * * * *